MIXED LINE INTERACTION CIRCUITS FOR COAXIAL MAGNETRONS

Filed Dec. 27, 1965

INVENTOR.
GEORGE K. FARNEY
BY Harry E. Aine
ATTORNEY

INVENTOR.
GEORGE K. FARNEY
BY Harry E. Aine
ATTORNEY

INVENTOR.
GEORGE K. FARNEY
BY
ATTORNEY

MIXED LINE INTERACTION CIRCUITS FOR COAXIAL MAGNETRONS

INVENTOR.
GEORGE K. FARNEY
BY
ATTORNEY

United States Patent Office 3,427,499

Patented Feb. 11, 1969

3,427,499

MIXED LINE INTERACTION CIRCUITS FOR COAXIAL MAGNETRONS

George K. Farney, New Providence, N.J., assignor to S-F-D Laboratories, Inc., Union, N.J., a corporation of New Jersey Filed Dec. 27, 1965, Ser. No. 516,631

U.S. Cl. 315—39.77 11 Claims

Int. Cl. H01j 25/50

ABSTRACT OF THE DISCLOSURE

Mixed line coaxial magnetron oscillator and amplifier tubes are disclosed. The tubes utilize a mixed line type of magnetron interaction circuit, namely, a circuit wherein a certain length of the circuit has a first dispersion characteristic and a second section of the interaction circuit has a second dispersion characteristic with the dispersion characteristics intersecting or nearly intersecting at only one common point of operation, at the $\pi$ mode, to exclude competing modes of operation, and to raise the power output substantially above that achievable with non-mixed line circuits. A circular electric mode wave supporting structure which may be a circular electric mode cavity or a circular electric mode waveguide is coaxially disposed of the mixed line interaction circuit either inside or outside of the interaction circuit. An array of conductive vanes serve to provide wave energy coupling between the circular electric mode structure and the mixed line interaction circuit. The vane array defines an array of slot resonators in the regions between adjacent vanes and the coupling slots are provided communicating between the slot resonators and the circuit electric mode structure, such coupling slots being provided only into such slot resonators having the same phase for the $\pi$ mode, in the slot array, whereby the $\pi$ mode of the mixed line interaction circuit is locked to the circular electric mode of the circular electric mode structure. In some embodiments, a tuning structure is provided in the circular electric mode circuit for tuning the frequency of the magnetron amplifier or oscillator. In an amplifier embodiment, the $\pi$ mode for one of the sections of the mixed line circuit is substantially at a different frequency than the $\pi$ mode of the other section of the mixed line circuit to provide substantial instantaneous bandwidth at the $\pi$ mode.

Figures 1, 2, 3, 4, 5, 6:
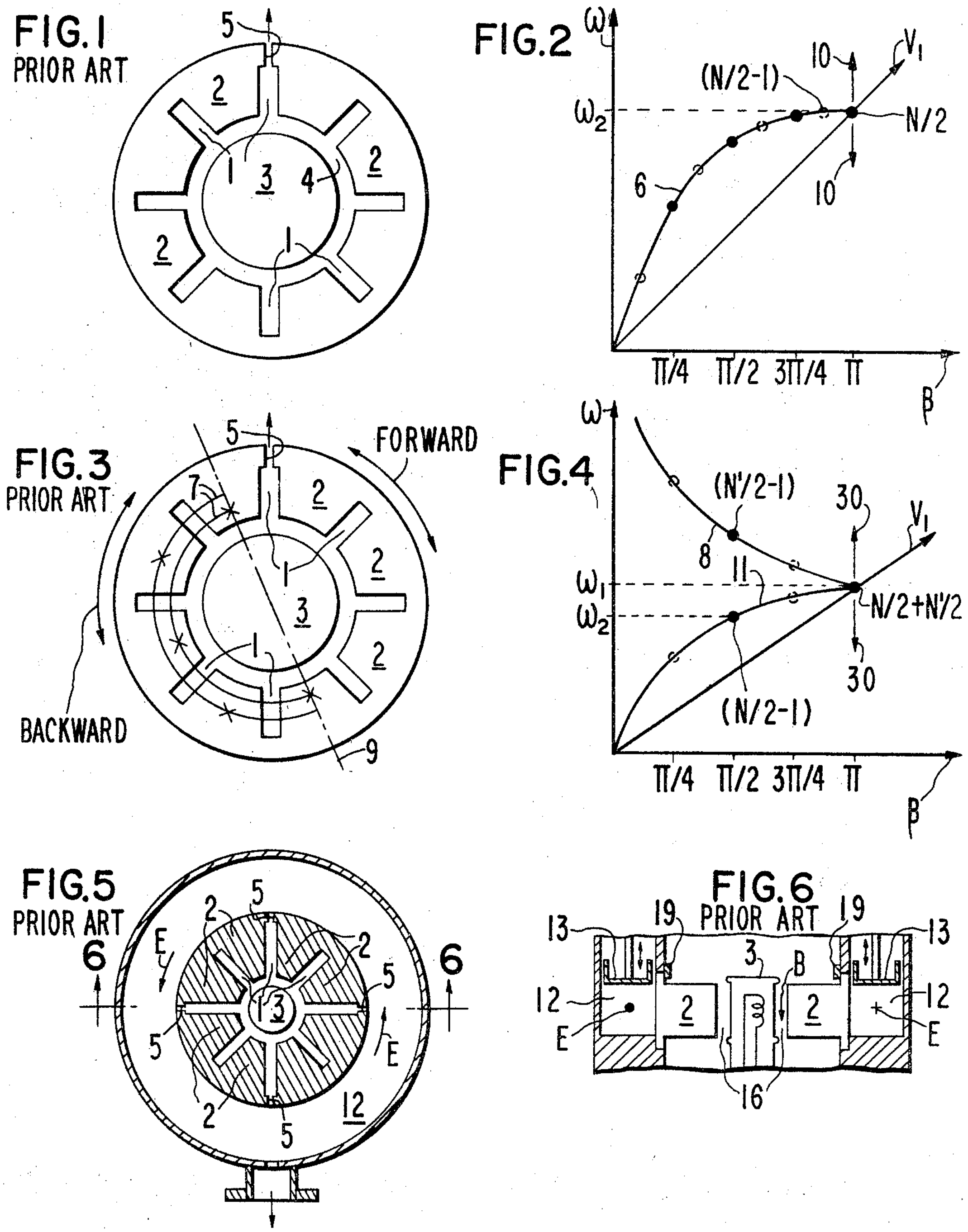
FIG. 1 PRIOR ART, FIG. 2, FIG. 3 PRIOR ART, FIG. 4, FIG. 5 PRIOR ART, FIG. 6 PRIOR ART

The present invention relates in general to an improved mixed line type of magnetron interaction circuit and more particularly to such a circuit especially adapted for use in coaxial magnetron oscillators and/or amplifiers for improving the output power performance of such tubes. Such improved coaxial magnetrons are especially useful, for example, as a source of tunable R.F. power for radar or as an extremely high power microwave amplifier for the final stage of a super power radar.

Heretofore, it has been proposed to employ mixed line sections in a magnetron interaction circuit to obtain enhanced mode separation and thereby permit higher output power without encountering undesired mode shifting of the output signal. Such a mixed line circuit is described in U.S. Patent 3,121,822 issued Feb. 18, 1964. Briefly, the mixed line circuit is formed by a composite interaction circuit having plural circuit sections of substantially different dispersion characteristics, preferably forward and backward wave, which dispersion curves intersect at only one common point of operation at the $\pi$ mode. In this manner competing modes are excluded from operation because the composite mixed line circuit will interact only with the $\pi$ mode for the single applied beam voltage. Excluding the competing modes permits raising the power output substantially above that achievable with non-mixed circuits. However, a need exists for means to tune these mixed line circuits at the achievable high power levels. In addition, a need exists for a coaxial magnetron amplifier of high efficiency and output power which is relatively free of moding problems.

In the present invention there are provided various novel coaxial mixed line circuits for use in both the reverse and normal coaxial magnetron geometries whereby the high efficiency $\pi$ mode of the magnetron interaction circuit may be controlled in frequency by the wave energy of the circular electric mode in the coaxial circuit portion. In addition, certain ones of the improved coaxial mixed line of the present invention eliminate the need for the conventional coupling slots between the magnetron interaction portion of the circuit and the coaxial circular electric mode supporting structure, thereby eliminating the need for slot mode absorbers. Lastly, staggered tuning of the $\pi$ mode frequencies of the different mixed line circuit sections yields broadband amplifier operation and allows tuning of a coaxial magnetron oscillator over a wider band of frequencies.

The principal object of the present invention is the provision of improved coaxial magnetron oscillators and/or amplifiers.

One feature of the present invention is the provision of composite mixed line magnetron interaction circuits including a coaxial circular electric mode structure coupled to the interaction circuit for controlling the frequency of the magnetron interaction, whereby practical tuning of an oscillator or efficient amplification of an input signal may be readily achieved.

Another feature of the present invention is the same as the preceding feature wherein the magnetron interaction circuit includes an array of shorted vanes with the shorted portions projecting from the interaction circuit into or through an annular gap in the side wall of the circular electric mode structure, in non-electrical contacting relation, for coupling wave energy between the circular electric mode and the interaction circuit, whereby the conventional array of long axial length coupling slots with their attendant slot modes are eliminated.

Another feature of the present invention is the same as the preceding feature wherein the vane shorting portions project through the annular slot and include an impedance transforming section protruding into the coaxial cavity for increasing the wave energy coupling between the circular electric mode and the magnetron interaction circuit.

Another feature of the present invention is the same as any one or more of the preceding features wherein one of the circuit sections of the magnetron composite mixed line interaction circuit is selected from the class consisting of an interdigital line and a bar circuit, each containing a coupled vane array, and wherein the vane array portion of the circuit section serves to couple the coaxial circular electric mode structure to the mixed line magnetron interaction circuit.

Another feature of the present invention is the same as any one or more of the preceding features wherein plural sections of the composite mixed line interaction circuit are dimensioned and arranged to have staggered $\pi$ mode resonant frequencies to enhance broadband operation.

Other features and advantages of the present invention will become apparent upon a perusal of the following specification taken in connection with the accompanying drawings wherein:

FIG. 1 is a schematic line diagram depicting a conventional prior art magnetron.

Figures 7, 8, 9, 10, 10B, 11A, 11B, 12A, 12B:
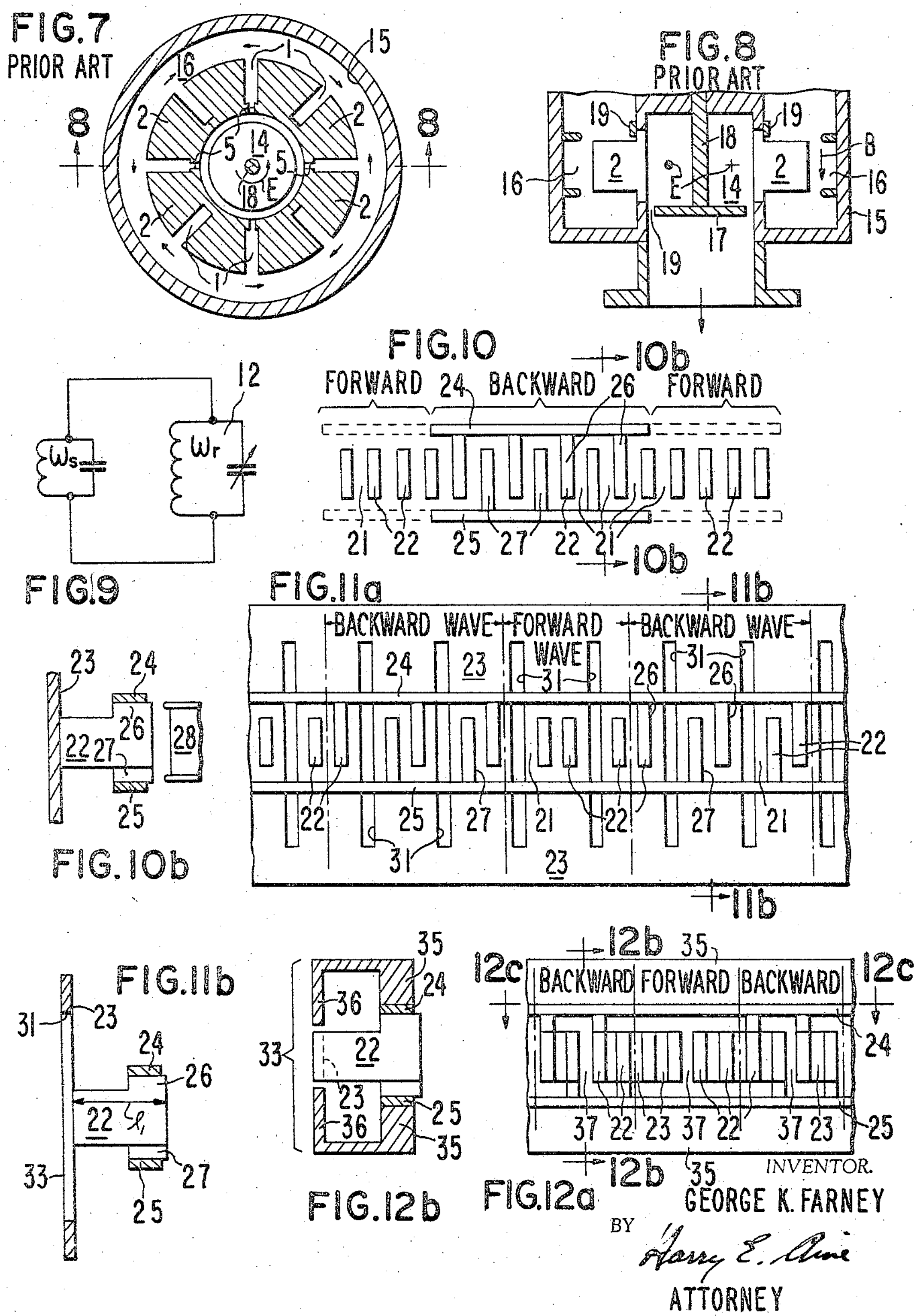
FIG. 7 PRIOR ART, FIG. 8 PRIOR ART, FIG. 9, FIG. 10, FIG. 10b, FIG. 11a, FIG. 11b, FIG. 12a, FIG. 12b
Figure 12C:
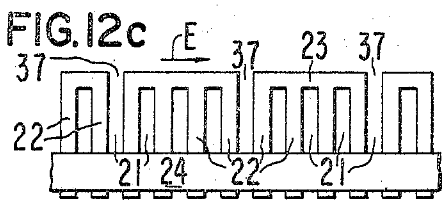
Figure 12D:
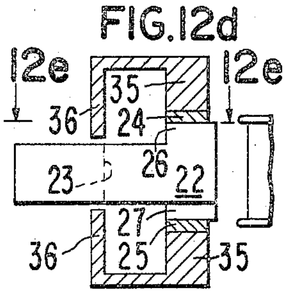
Figure 12E:
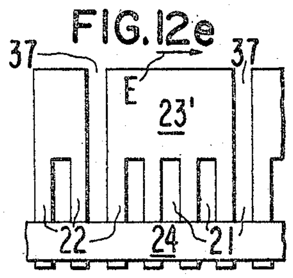
Figure 13A:
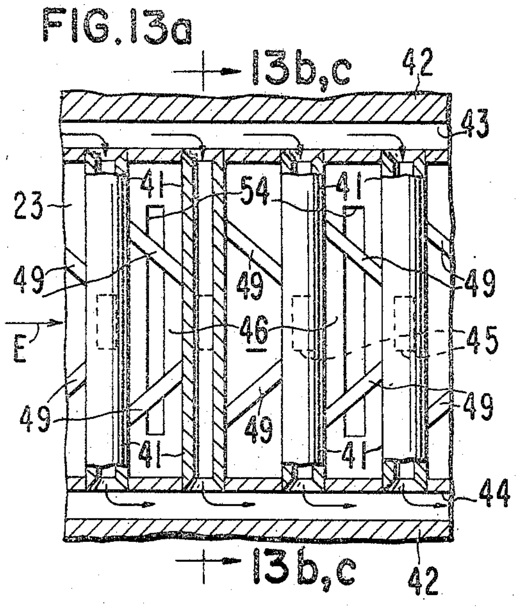
Figure 13B:
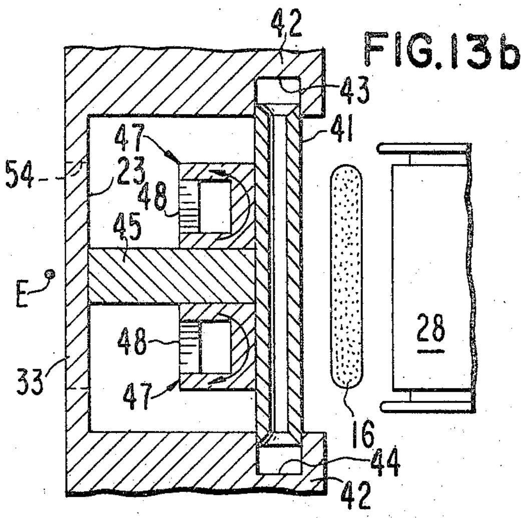
Figure 13C:
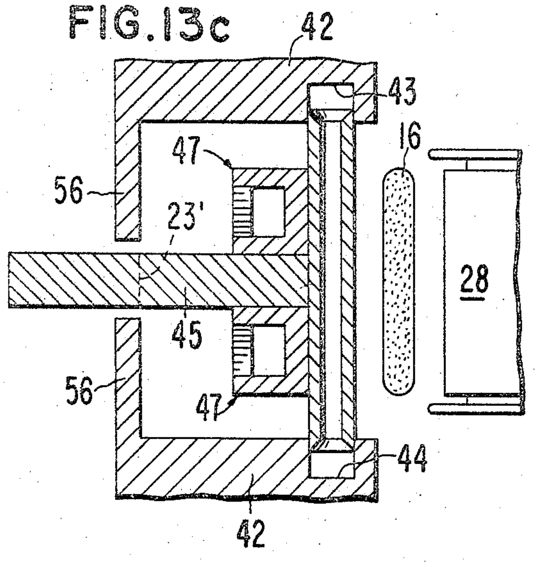
Figure 14A:
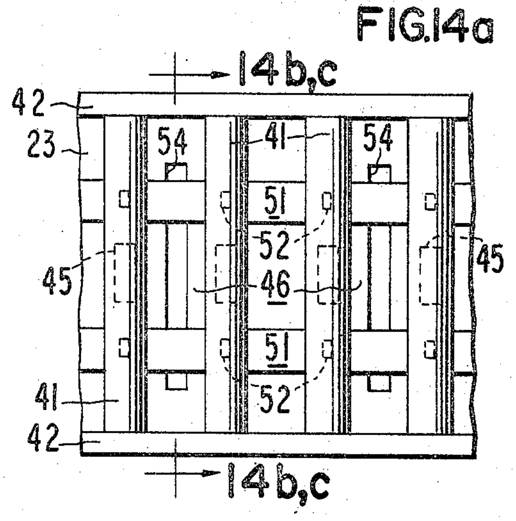
Figure 14B:
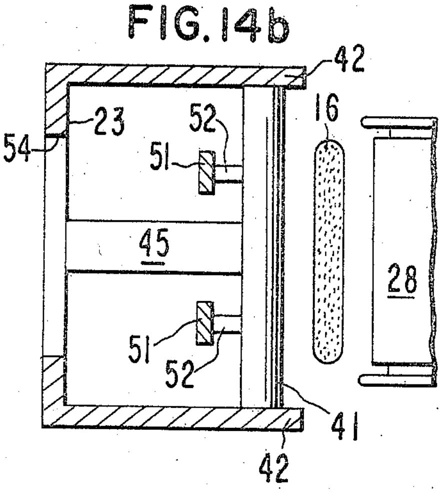
Figure 14C:
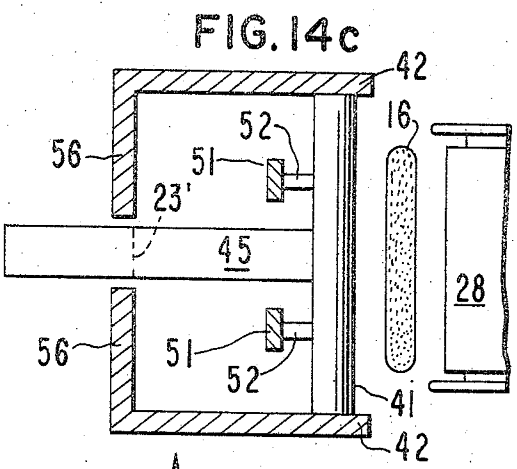

FIG. 2 is an $\omega$-$\beta$ diagram showing the dispersion characteristics of the circuit of FIG. 1, FIG. 3 is a transverse diagrammatic sectional view of a prior art mixed line magnetron for improved mode control, FIG. 4 is an $\omega$-$\beta$ diagram for the structure of FIG. 3 showing the dispersion characteristics and the mode separation attained by mixed line tubes, FIG. 5 is a transverse schematic line diagram of a normal coaxial magnetron of the prior art, FIG. 6 is a transverse sectional view of a portion of the structure of FIG. 5 taken along line 6—6 in the direction of the arrows, FIG. 7 is a transverse schematic line diagram of a reverse coaxial magnetron of the prior art, FIG. 8 is a longitudinal sectional view of the structure of FIG. 7 taken along line 8—8 in the direction of the arrows, FIG. 9 is a schematic circuit diagram showing the equivalent circuit for a coaxial magnetron structure of the type shown in FIGS. 5–8, FIG. 10 is a schematic line diagram of a composite mixed line magnetron interaction circuit of the vane type, FIG. 10*b* is a sectional view of a vane taken along line **10*b*** of FIG. 10, FIG. 11 is a schematic line diagram of the circuit of FIG. 10 as provided with coupling slots for coupling to a coaxial circular electric mode structure, FIG. 12 is a schematic line diagram of a circuit embodiment of the present invention wherein the circuit has been modified to eliminate the long slots coupling between the circular electric mode and the vane type mixed line magnetron interaction circuit, FIG. 12*b* is a sectional view of a portion of the structure of FIG. 12*a* along line **12*b***, FIG. 12*c* is a sectional view of a portion of the structure of FIG. 12*a* along line **12*c***, FIGS. 12*d* and 12*e* are alternative embodiments of the structure of FIG. 12, FIGS. 13–14 are schematic line diagrams of bar type magnetron interaction circuits of the mixed line type as modified to include the features of the present invention for coupling to a coaxial circular electric mode wave supporting structure, FIGS. 13*b* and 13*c* are sectional views of portions of the structure of FIG. 13*a* along lines **13*b* and 13*c***, FIGS. 14*b* and 14*c* are sectional views of portions of the structure of FIG. 14*a* along lines **14*b* and 14*c***.

Figure 16A:
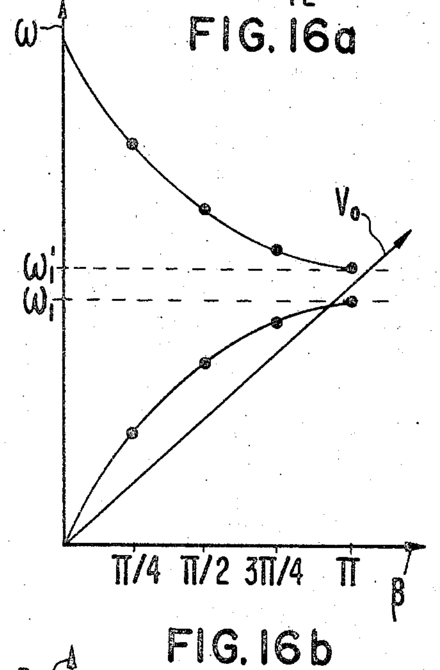
Figure 15:
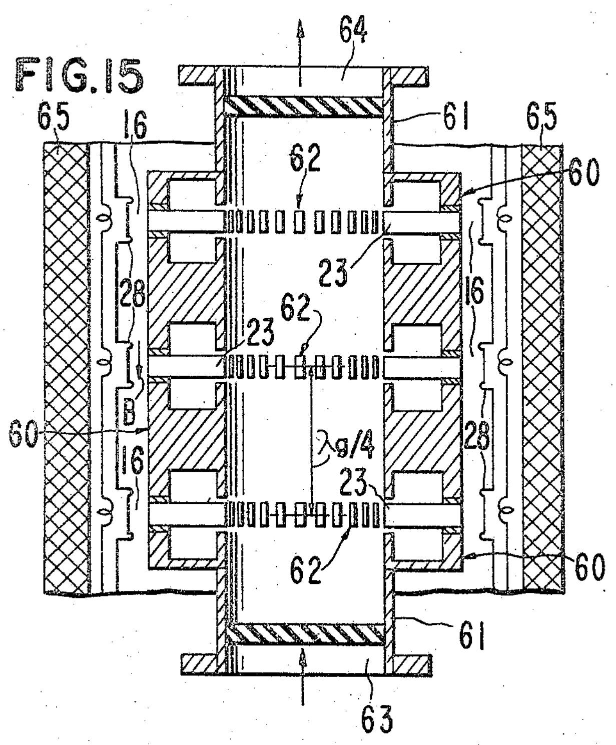
Figure 16B:
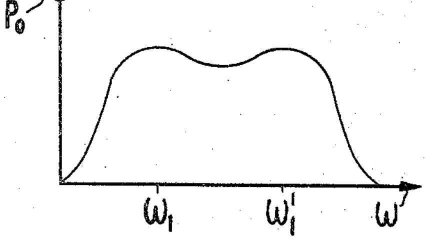

FIG. 15 is a longitudinal sectional view of a magnetron amplifier structure incorporating features of the present invention, and FIG. 16 is an $\omega$-$\beta$ diagram depicting the dispersion characteristics for a staggered tuned amplifier circuit of the present invention. FIG. 16*a* is a $\omega$-$\beta$ diagram and FIG. 16*b* is a P-$\omega$ diagram.

Referring now to FIGS. 1–10, there will be given a certain amount of background information which will make the features and advantages of the present invention more apparent.

Referring now to FIG. 1, there is shown the conventional vane or slot magnetron circuit. The circuit comprises an array of radially directed slots 1 which are a quarter-wavelength long at the upper cut-off frequency $\omega_2$ of the tube, see FIG. 2. The conductive member between adjacent slots 1 is a vane 2 and the circuit may be considered as a vane circuit as well as it may be considered as a slot circuit. The array of vanes 1 surrounds a cathode emitter 3 and a magnetron interaction region 4 is defined by the annular space between the anode containing the slot resonators 1 and the coaxial cathode emitter 3. One of the slot resonators includes an output coupling slot 5 formed in the back wall thereof for coupling to a load, not shown.

The circuit of FIG. 1 has a dispersion characteristic as shown in FIG. 2. Due to the re-entrant nature of the anode resonant slot circuit, the dispersion characteristic of the circuit is discontinuous in the sense that electronic interaction is obtained only for phase shift $\beta$ per section which will satisfy the condition that an integral number of full-wavelengths of wave energy, propagating on the circuit, can be fitted around the anode circuit. The result is that an anode having N slot resonators will have $N/2$ possible resonant modes of oscillation as indicated by the solid dots on the dispersion characteristic curve 6 of FIG. 2. Note that the resonant modes are equally spaced in $\beta$ and that if the anode contained twice as many slots as shown there would be twice as many resonant modes of oscillation as indicated by the dotted circles on the dispersion characteristic 6.

From a practical standpoint, it is found that if the number of resonators in the anode circuit is increased beyond 16 that serious moding problems occur because the synchronous beam velocity indicated by $V_1$ of FIG. 2, necessary for synchronous interaction with the $\pi$ mode, is very close to the synchronous velocity and the frequency of the next closest resonant mode $$\left(\frac{N}{2}-1\right)$$

and therefore the tube may oscillate on either one of the adjacent modes in a spurious manner.

Referring now to FIG. 3, there is shown a prior art circuit for eliminating the moding problems encountered with the circuit of FIG. 1. More specifically, FIG. 3 shows the prior art mixed line composite magnetron interaction circuit having successive sections of different dispersion characteristics to obtain enhanced mode separation. In this case, a pair of coupling straps 7 which are conductively connected to alternate vanes 1 causes that portion of the circuit which is strapped to have a backward wave fundamental dispersion characteristic as shown by curve 8 of the $\omega$-$\beta$ diagram of FIG. 4.

If a non-reflective impedance match is obtained between the backward and forward wave sections at their junctions, as indicated by the dashed line 9, the dispersion characteristic for the composite circuit will have two branches, an upper branch corresponding to the backward wave section as indicated by line 8 and a forward fundamental wave branch as indicated by line 11. However, one important difference should be noted and that is that the number of possible resonant modes in each branch is one half that of the circuit of FIG. 1. More particularly, there are now one $N/2$ modes in each branch where N is now the number of resonators in that particular section of the composite circuit. Thus, for the circuit of FIG. 3 having two different circuit sections, namely, a backward and forward wave section, the possible modes of oscillation for each branch of the composite circuit is as indicated by the solid dots of the dispersion characteristics 8 and 11. If the two circuit sections are dimensioned to have a common $\pi$ mode operating frequency, it is seen that the possible competing modes are widely separated from the desired $\pi$ mode.

Thus, the mixed line type of magnetron interaction circuit characterized by the structure of FIG. 3 permits greatly enhanced mode separation. This enhanced mode separation is obtained for a greatly increased total number of slot resonators since the composite magnetron interaction circuit may be broken up into many successive interaction sections of alternating backward and forward wave type and the dispersion characteristics for such a composite structure remain as for the two section circuit shown in FIG. 4.

The solid dots on the dispersion characteristic curves of 8 and 11 correspond to the circuit of FIG. 3 with matched impedance transitions between the forward and backward wave sections. However, it is impossible to match the junctions 9 due to the different dispersion characteristics of the adjacent structures and thus the wave reflection will introduce twice as many resonant modes as encountered if the junctions were matched. Accordingly, additional modes of oscillation will be introduced inbetween the solid dots. These modes are indicated by the dotted circles on the dispersion curves 8 and 11 of FIG. 4. However, even with these additional modes of oscillation, it is seen that adequate mode control and separation can be obtained with a synchronous voltage $V_1$ assuming the separate sections of the composite mixed line circuit include 4 elements. Although the circuit of FIG. 3 shows only two sections to the composite line, it is to be understood that many sections may be added thereby adding many additional slot resonators. Provided each of the separate sections of backward and forward wave characteristics have a relatively small number of sections such as, for example, 4, the dispersion characteristic for the composite circuit will remain substantially as that shown in FIG. 4.

Referring now to FIGS. 5 and 6, there is shown the conventional normal coaxial magnetron. In this circuit the conventional magnetron circuit of FIG. 1 is coupled to a coaxially surrounding circular electric mode resonator 12 via the intermediary of a plurality of axially directed coupling slots 5 communicating through the anode structure into the back wall of alternate slot resonators 1. Because the circular electric mode resonator 12 has an electric field vector E which forms a closed electric field pattern of non-reversing phase around the circumference of the anode and because this mode is coupled via slots in the back wall of alternate resonators 1, it serves to thereby lock alternate resonators to a constant phase of the circular electric mode of the resonator 12. Since the other slot resonators 1 of the anode circuit which are not coupled via the slots 5 may assume a phase which is 180° to the phase in the coupled resonators, the coupling to the coaxial resonator 12 serves to lock the phase of the anode circuit of the magnetron to the $\pi$ mode of oscillation. Tuning is then obtained of the $\pi$ mode in the magnetron interaction circuit by provision of a tuning structure 13 provided in the coaxial resonator 12 for varying the $\pi$ mode frequency of the locked anode system in the manner as indicated by the arrows 10 of FIG. 2.

The equivalent circuit for the coaxial magnetron of FIGS. 5 and 6 is shown in FIG. 9. Briefly, the electrical effect of the coaxial resonator having a resonant frequency, $\omega_T$, is to lock the anode resonators 1 to their $\pi$ mode frequency and pull the $\pi$ mode frequency, $\omega_S$, along with changes in the frequency of the coaxial resonator 12. Because of the larger energy storage in the coaxial resonator 12, a considerable stabilizing effect is obtained against possible other interfering modes of operation. Thus, using the coaxial magnetron geometry the number of slot resonators 1 may be substantially increased without experiencing undesired competing mode problems.

Referring now to FIGS. 7 and 8, there is shown a reverse coaxial magnetron geometry wherein the array of slot resonators 1 surrounds a circular electric mode cavity resonator 14. Alternate ones of the slot resonators 1 are coupled to the circular electric mode of the coaxial cavity 14 via the intermediary of coupling slots 5 communicating through the anode wall with the back portions of alternate slot resonators. In this manner, the circular electric mode of the cavity 14 serves to phase lock the slot resonators 1 to the $\pi$ mode of operation as previously described with regards to FIGS. 5 and 6. The anode slot resonators 1 are surrounded by a cathode emitter 15 defining a magnetron interaction region 16 therebetween. The $\pi$ mode of the slot resonator array 1 is tuned by tuning the coaxial resonator 14 by means of a movable end wall 17. The movable end wall 17 is carried upon a conductive rod 18. The end wall 17 is disk-shaped including an annular gap between the side wall of the resonator 14 and the end wall 17 for coupling energy from the cavity 14 to a load, not shown. The tuning wall 17 is axially translatable of the cavity 14 for changing the resonant frequency of the tube.

While the coaxial magnetrons of FIGS. 5–8 provide improved $\pi$ mode control and readily permit tuning, it is found that the slots 5, which communicate between the coaxial resonator and the array of slot resonators, introduce certain undesired slot modes of resonance requiring the provision of lossy slot mode absorbing elements 19 adjacent the slots 5. Such mode absorbers 19 can become over-heated and out-gas during operation of the tube and are generally troublesome.

Referring now to FIG. 10, there is shown a strapped vane type composite mixed line magnetron interaction circuit, especially suitable for use in coaxial magnetron tubes. This type of mixed line vane circuit forms the subject matter of and is claimed in co-pending U.S. application 516,271, filed Dec. 27, 1965, and assigned to the same assignee as the present invention. Briefly, the circuit comprises an array of quarter-wavelength vane elements 22 as of copper projecting outwardly from a conductive back wall 23 as of copper and defining an array of slot resonators 21 in the spaces between adjacent vanes 22. The composite circuit includes a backward and a forward wave section. The backward wave section includes a pair of straps 24 and 25 overlying the top and bottom side edges of the vanes 22 substantially near the end thereof. Adjacent vanes 22 are connected to the opposite strap of the pair of straps via conductive tab portions 26 and 27 as of copper to form a section of interdigital line. The forward wave section of the composite line circuit is formed by unstrapped sections of the vane resonator circuit. However, the pair of straps 24 and 25 may overlay the unstrapped vane portions to obtain additional capacitive coupling thereto. A vane circuit with overlying strap portions for additional capacitive coupling forms the subject matter of a co-pending U.S. application 463,221, filed June 11, 1965 now U.S. Patent 3,411,034 and assigned to the same assignee as the present invention. A cathode emitter 28 may be spaced from the ends of the vanes 22 to define a magnetron interaction region therebetween. The circuit of FIG. 10 is shown in linearized form merely for the sake of explanation and it is to be understood that the circuit, although it may be employed in linear form, in a typical application, it could be disposed either surrounding or being surrounded by a cathode emitter 28. The circuit of FIG. 10 thus provides a composite mixed line circuit suitable for vane type magnetron circuits.

Referring now to FIG. 11, there is shown a circuit embodiment of the present invention. More specifically, the magnetron interaction circuit of FIG. 10 is coupled to a circular electric mode wave supporting structure 33 on the remote side of the common wall 23 by means of an axially directed array of coupling slots 31 communicating through the common wall 23 in registry with alternate slot resonators 21 defined by the spaces between adjacent vane elements 22.

The composite circuit of FIG. 11 has the dispersion characteristics 8 and 11 of FIG. 4 and provides the improved mode control of the composite mixed line circuit plus the additional mode control of a coaxial circular electric mode geometry while permitting a very large number of vane resonators to be employed in the magnetron interaction circuit. This coaxial magnetron geometry has the added advantage over the ordinary magnetron geometry of FIG. 10 in that the circular electric mode structure provides, in the case of a tunable magnetron, a very convenient and effective way for tuning the resonant frequency of the magnetron over a wide range of frequencies as indicated by the arrows 30 of FIG. 4.

The circuit of FIG. 11 is also useful in non-tuned circular electric mode magnetron amplifiers wherein the circular electric mode structure 33 forms the wave supporting structure for the wave energy to be amplified. This energy is then coupled via the slots 31 and vane array 22 to the magnetron interaction region for supplying energy to the wave being amplified. The amplifier embodiment is more fully described below with regard to FIG. 15.

While the composite mixed line vane circuit of FIG. 11 has the advantages of coaxial magnetron geometries, it still has the disadvantage of possible slot modes of resonances associated with the array of coupling slots 31. Conventional slot mode absorbing methods may be utilized for absorbing energy of the slot modes but it would be to advantage if the long slots 31 could be eliminated entirely.

Referring now to FIG. 12, there is shown a preferred embodiment of the present invention wherein a coaxial vane magnetron interaction circuit is provided which eliminates the long coupling slots between the circular electric mode structure and the magnetron interaction region. More specifically, the circuit includes the forward and backward wave sections of unstrapped and interdigital line, respectively, as previously described with regard to FIG. 11. The back wall 23, however, has been reduced in axial length to substantially the same height as the vane members 22 and the circuit is supported via the intermediary of the straps 24 and 25, respectively, in a crown support manner from an axially directed wall 35 as of copper. The support wall 35 includes a portion which projects backwardly toward the rear of the vanes with a pair of axially directed curtain wall segments 36 which approach but do not come in actual conductive contact with the back wall segment 23. Wall segments 36 and 23 serve to support the circular electric mode and to define the wave supporting wall of the circular electric mode structure 33. Short axially directed coupling slots 37 are provided through the back wall 23 segment communicating with the slot resonator portions 21. Unlike the structure of FIG. 11 the slots 37 do not communicate through every alternate slot resonator 21. Rather the slots 37 are cut through the back wall 23 communicating with only certain ones of the slot resonators 21 which are all in phase for the $\pi$ mode of operation of the strapped vane circuit. Furthermore, the slots 37 are placed such that each annular segment of the anode wall 23 which is formed by the segment between communicating slots 37 is connected to the straps 24 or 25 by at least two tab segments 26 and 27 disposed on opposite sides of the wall segment. In this manner the circular electric mode of the circular electric mode structure is coupled to the $\pi$ mode of the vane circuit and the long coupling slots 31 have been eliminated.

In FIGS. 12*d* and 12*e* there is shown an alternative embodiment to the structure of FIG. 12*a–c*, wherein the back wall 23 is made to have a substantial thickness which may be up to nearly a quarter-wavelength, to provide an impedance transformer 23' for transforming the low impedance of the rear wall of the slot resonators 21 to the electric field of the circular electric mode structure. The transformer section 23' facilitates tighter energy coupling between the circular electric mode and the $\pi$ mode of the interaction circuit.

Referring now to FIG. 13, there is shown a bar type magnetron interaction circuit of the present invention specially adapted for use in coaxial magnetrons.

More specifically, the circuit comprises an array of axially directed bars 41 as of copper shorted together at their ends by means of a pair of conductive walls 42 which may also serve as the support structure for the bar circuit. In order to facilitate cooling the bars 41 may be conveniently made of copper tubing with the bore of the tubing intersecting with input and output coolant channels 43 and 44 formed in the walls 42. The bars 41 define an array of half wavelength slot resonators between adjacent bars 41. The bars 41 are also supported intermediate their length by means of an array of conductive vane members 45 as of copper which may extend back to the conductive wall 23. As in the embodiments of FIGS. 10–12, wall portion 23 may have an axial height substantially only equal the height of the vane members 45 as shown in FIG. 13*c* and as previously described with regard to FIG. 12. The vane members 45 are made to have a length which is approximately one-half the length of the bars 41. The vanes 45 and bars 41 define in the T-shaped spaces therebetween an array of T-shaped slot resonators 46.

A pair of low impedance helices 47 as of copper extend longitudinally of the bar circuit portion and preferably are brazed both to the vanes 45 and the bars 41 at each turn of the helix. The helices 47 are conveniently formed from a heavy walled conductive tube as of copper having a rectangular cross-section. The tube is slotted with an array of transverse slots of the same width as slots 46 passing through three sides of the rectangular tube and leaving one unslotted side wall 48 on the side remote from the bars 41. The remote side 48 is then slotted with an array of diagonal slots which intersect with adjacent transverse slots thereby leaving an array of diagonal conductive members 49 interconnecting adjacent turns of the helices 47. One of the helices 47 is formed to have a counter-clockwise rotating pitch while the other helix has a clock-wise pitch taken in the direction of circuit development along the bar circuit thereby forming a pair of contrawound helices. An array of axially directed coupling slots 54 communicate through the wall 23 with alternate slot resonators 46 for locking the circular electric mode of the circular electric mode structure 33 on the remote side of the wall 23 to the magnetron interaction bar circuit. The dual helix coupled bar circuit of FIGS. 13*a* and *b* has a fundamental forward wave dispersion characteristic as shown by line 11 of FIG. 4.

The forward wave circuit portion of FIG. 13 adjoins, in the composite mixed line circuit, a backward wave bar circuit portion which may be of the type as shown in FIG. 14. More specifically, the backward wave circuit portion is the same as the forward wave section with the exception that the helices 47 are replaced by a pair of straps 51 as of copper which are each connected to alternate bars 41 of the array via conductive tabs 52. An array of axially directed coupling slots 54 are cut through the common wall 23 in registry with alternate slot resonators 46 to lock the circulator electric mode of the circulator electric mode structure 33 to the $\pi$ mode of the composite mixed line magnetron interaction circuit. The dual helix coupled vane loaded bar circuit of FIG. 13 forms the subject matter of and is claimed in co-pending U.S. application 523,490, filed Dec. 15, 1965, and dual helix coupled bar circuits are described and claimed in co-pending U.S. application 514,088, filed Dec. 15, 1965. Both of these applications are assigned to the same assignee as the present invention.

Referring now to FIGS. 13*c* and 14*c* the long slot array 54 communicating between the circular electric mode structure 33 and the magnetron interaction region may be shortened by reducing the axial height of the back wall 23 to substantially the same height as the vane members 45 and extending the supporting wall structure 42 back in the direction of the vanes 45 and down toward the vane members 45 to provide a pair of curtain wall portions 56 for defining the structure 33 for supporting the circular electric mode on the circular electric mode side of the composite circuit. Moreover, as in prior embodiments described above it may be desirable to provide an impedance transformer for coupling the vane resonators 45 to the circular electric mode of the circular mode structure. In which case, the back wall member 23' may be extended in thickness up to a quarter-wavelength long to enhance impedance transforming action and coupling to the circular electric mode as previously described with regard to FIGS 12*d* and *e*.

An advantage of the composite mixed line bar type magnetron interaction circuits of FIGS. 13 and 14 over the vane circuits is the higher thermal capability. Moreover, the bar circuit is more rugged because the bar members 41 may be rigidly supported at their ends and are also supported from the middle via the vane members 45. Even in the case where the vane members 45 do not help to support the bar circuit, the structure is more rugged than the vane circuit of FIG. 12 since the vane members 45 are supported from the bars 41 and the coupling slots may communicate with alternate slot resonators without interfering with support of the vane structure.

Referring now to FIG. 15, there is shown a multi-stage amplifier embodying features of the present invention. More specifically, a super-power amplifier tube is formed by successively coupling a plurality of coaxial mixed line magnetron interaction circuits of the present invention, and as previously described in FIGS. 11–14, to a circular electric mode waveguide 61. The magnetron interaction circuits 60 surround the circular electric mode guide 61 and are coupled thereto as by, for example, the short slot arrays 62 of FIGS. 12, 13*c* and 14*c*. As an alternative the longer slot arrangements, as exemplified in FIGS. 11, 13*a–b* and 14*a–b* may be employed. The magnetron interaction regions 60 are coupled to the circular electric guide 61 at intervals which are near 90 electrical degrees of phase difference in the guide 61 to obtain a directional coupling effect such that an input signal applied at terminal 63 and after amplification by the first magnetron interaction region will add its energy to the amplified signal produced in successive magnetron interaction regions 60 progressing up the guide 61. In this manner a greatly amplified output signal is obtained at the output terminal 64. A solenoid 65 surrounds the cathode emitter structures 28 to provide the axially directed magnetic field for the magnetron interaction regions 16. Use of the coaxial mixed line magnetron interaction circuits of the present invention, in the amplifier embodiment of FIG. 15, allows much greater control over competing modes and much higher power handling capability for the tube as compared to prior art coaxial magnetron amplifiers. If back wall slot transformer sections 23' are employed, it is convenient for them to decrease in radial thickness in successive amplifier stages 60 taken in the direction of signal amplification in guide 61. This is done because less percentage of energy in the guide, due to amplification, needs to be fed to the magnetron interaction regions 16.

The bandwidth for the amplifier of FIG. 15 may be increased by stagger tuning the $\pi$ mode frequencies of the backward and forward wave sections of each of the composite mixed line magnetron interaction circuits 60 in the manner as shown in FIGS. 16*a* and *b*. More specifically, the backward wave circuit section of either the vane or bar type may be dimensioned and arranged such that its $\pi$ mode frequency, $\omega'_1$, is tuned substantially above the resonant $\pi$ mode resonant frequency, $\omega_1$, for the forward wave section of the composite line. As shown in FIG. 16*b* this will allow the power output characteristic as a function of frequency to have a double peaked response yielding substantially improved bandwidth characteristics as compared to a circuit wherein both the forward and backward wave circuit sections have a common $\pi$ mode frequency.

The separation in the frequencies between the $\pi$ mode for the backward and forward wave circuit sections may be obtained for the vane and bar circuits as follows: For the vane circuits of FIGS. 11 and 12, the backward wave $\pi$ mode frequency may be increased by decreasing the distance from the back wall 23 to the tips of the vanes 22, the dimension $1_1$ of FIG. 11*b*. For the bar circuit, the backward wave section may have its $\pi$ mode raised in frequency relative to that of the forward wave section by making the bars 41 in the backward wave section shorter than the bars in the forward wave section.

Since many changes can be made in the above constructions and apparently widely different embodiments could be made without departing from the scope thereof, it is intended that all matter contained in the above description or shown in the accompanying drawings shall be interpreted as illustrative and not in a limiting sense.

What is claimed is:

1. A coaxial magnetron tube apparatus including, means forming a mixed line type of magnetron interaction circuit, means for projecting a stream of electrons adjacent said interaction circuit for electromagnetic interaction therewith, means forming a circular electric mode wave supportive structure coaxially disposed of said mixed line magnetron interaction circuit, means for providing wave energy coupling between said circular electric mode structure and said mixed line magnetron interaction circuit for locking the phase of the circular electric mode of wave propagation on said circular electric mode structure to the $\pi$ mode of said mixed line magnetron interaction circuit, whereby the operating $\pi$ mode frequency of said magnetron interaction circuit is controlled by the wave energy on said circular electric mode structure, said magnetron interaction circuit including an array of conductive elements extending toward said circular electric mode structure with adjacent elements being shorted by a conductive wall portion at their ends to define an array of resonators in the region between adjacent conductive elements, and wherein said coupling means between said circular electric mode structure and said magnetron interaction circuit comprises an array of coupling slots communicating through said conductive wall portions substantially only to those resonators having the same phase for the $\pi$ mode in said array of resonators.

2. The apparatus of claim 1 wherein said conductive elements are vanes and said resonators are slot resonators.

3. The apparatus according to claim 2 wherein said circular electric mode structure is tubular having an arcuate gap transverse to the longitudinal axis thereof, and said shorting conductive end wall portions of said vane resonators projecting into said gap in non-electrical contacting relationship therewith, whereby certain undesired slot modes are eliminated.

4. The apparatus according to claim 3 wherein said shorting conductive wall portion projects through said gap into said tubular circular electric mode wave supporting structure to provide an impedance transformer to said array of slot resonators.

5. The apparatus according to claim 2 wherein one of the circuit sections of said composite magnetron interaction circuit is an interdigital line circuit.

6. The apparatus according to claim 2 wherein one of the circuit sections of said mixed line magnetron interaction circuit consists of an array of bars electrically connected intermediate their length to said vanes of said vane array to improve the thermal and mechanical properties of the magnetron interaction circuit.

7. The apparatus according to claim 6 wherein said section of magnetron interaction circuit containing said bar array is a forward wave fundamental circuit having a pair of helices connected to said array and running lengthwise thereof for electromagnetically coupling together said bars of said array.

8. The apparatus according to claim 2 wherein said circular electric mode structure is a circular electric mode cavity resonator, and including means within said circular electric mode resonator for changing the frequency thereof whereby the operating frequency of the coaxial magnetron tube is tuned.

9. The apparatus according to claim 2 wherein different circuit sections of said mixed line magnetron interaction circuit are dimensioned and arranged to have substantially different $\pi$ mode resonant frequencies to enhance broadband operation of the coaxial magnetron tube.

10. The apparatus according to claim 9 wherein said circuit sections having substantially different dispersion characteristics are of the forward and backward wave type in the fundamental mode, and wherein said backward wave section has a $\pi$ mode resonant frequency substantially above the $\pi$ mode resonant frequency for said forward wave section.

11. A coaxial magnetron tube apparatus including, means forming a mixed line type of magnetron interaction circuit, means for projecting a stream of electrons adjacent said interaction circuit for electromagnetic interaction therewith, means forming a circular electric mode wave supporting structure coaxially disposed of said mixed line magnetron interaction circuit, means for providing wave energy coupling between said circular electric mode structure and said mixed line magnetron interaction circuit for locking the phase of the circular electric mode of wave propagation on said circular electric mode structure to the $\pi$ mode of said mixed line magnetron interaction circuit, whereby the operating $\pi$ mode frequency of said magnetron interaction circuit is controlled by the wave energy on said circular electric mode structure, said circular electric mode structure comprising a tubular circular electric mode guide having an input and output terminal at the ends thereof, said guide having a plurality of said mixed line magnetron interaction circuits coupled to said guide in axially spaced relation along said guide intermediate its length between said input and output terminals for successive stages of amplification of a wave propagating in said guide from said input terminal to said output terminal, and wherein successive interaction circuits are coupled to said guide at points along said guide corresponding to approximately 90 electrical degrees of phase shift of the wave to be amplified traveling in the axial direction along said guide, whereby the signal wave is caused to grow from input to output terminal.

References Cited

UNITED STATES PATENTS

| | | | |
|---|---|---|---|
| 2,854,603 | 9/1958 | Collier et al. | 315—39.75 X |
| 3,176,188 | 3/1965 | Wilbur | 315—39.65 |
| 3,121,821 | 2/1964 | Yu | 315—39.69 |
| 3,121,822 | 2/1964 | Boyd | 315—39.69 |
| 3,223,882 | 12/1965 | Thal | 315—39.77 X |

HERMAN KARL SAALBACH, *Primary Examiner.*

S. CHATMON, Jr., *Assistant Examiner.*

U.S. Cl. X.R.

315—3.6, 39.67, 39.75; 333—31